United States Patent [19]

Cosar

[11] Patent Number: 4,465,460

[45] Date of Patent: Aug. 14, 1984

[54] PRODUCTION OF CEMENT CLINKER

[75] Inventor: Paul Cosar, Paris, France

[73] Assignee: Fives-Cail Babcock, Paris, France

[21] Appl. No.: 537,179

[22] Filed: Sep. 29, 1983

Related U.S. Application Data

[62] Division of Ser. No. 370,540, Apr. 21, 1982, Pat. No. 4,421,563.

[30] Foreign Application Priority Data

May 15, 1981 [FR] France ................................. 81 09692

[51] Int. Cl.³ .............................................. F27B 7/02
[52] U.S. Cl. ..................................... 432/106; 110/347
[58] Field of Search .................. 432/106, 14; 110/245, 110/347

[56] References Cited

U.S. PATENT DOCUMENTS

| | | | |
|---|---|---|---|
| 3,947,238 | 3/1976 | Fukuda et al. | 432/106 |
| 4,236,886 | 12/1980 | Ansen et al. | 110/347 |
| 4,280,418 | 7/1981 | Erhard | 110/347 |
| 4,299,564 | 11/1981 | Herchenbach et al. | 432/106 |
| 4,310,298 | 1/1982 | Abelitis | 432/106 |
| 4,372,784 | 2/1983 | Hess | 432/106 |
| 4,402,667 | 9/1983 | Goldmann | 432/106 |

Primary Examiner—Henry C. Yuen
Attorney, Agent, or Firm—Kurt Kelman

[57] ABSTRACT

To permit the utilization of high-sulfur content solid fuels in the production of cement clinker in rotary kilns, the solid fuel is gasified and the gasified fuel is contacted with a fraction of the raw material used for the production of the cement clinker to desulfurize the gasified fuel, the desulfurized gasified fuel being delivered to a calcination stage and/or the rotary kiln for furnishing calories thereto.

5 Claims, 1 Drawing Figure

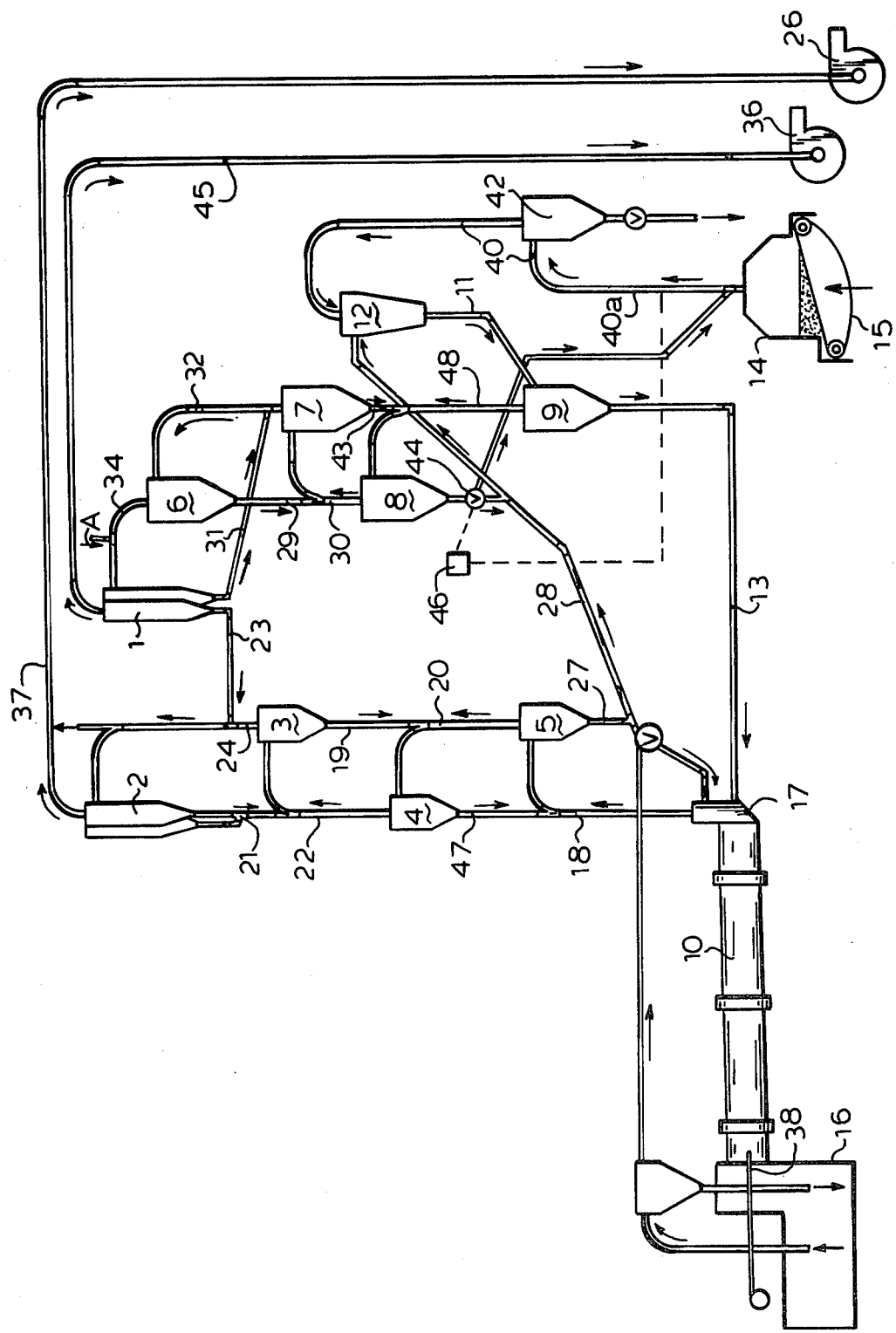

PRODUCTION OF CEMENT CLINKER

This application is a division of application Ser. No. 370,540 filed on Apr. 21, 1982, now U.S. Pat. No. 4,421,563.

The present invention relates to improvements in installation for the production of cement clinker from dry raw material, such as finely divided cement raw meal.

It is known in the production of cement clinker to preheat the raw material in heat exchange with combustion gases exhausted from the rotary kiln and, optionally, to pass the preheated raw material through a calcination stage and to furnish sufficient calories to the calcination stage for calcining the preheated raw material before it is delivered to the rotary kiln.

For economic reasons, it has been proposed to utilize such poor solid fuels as oil shale, industrial or agricultural wastes, and the like in cement production plants, as elsewhere. When such fuels contain substantial proportions of sulfur, their use in cement production poses problems because they tend to cause encrustations on the walls of plant components, which leads to operating failures and necessitates more or less frequent plant shut-downs. In an effort to remedy this condition, it has been proposed to eject a fraction of the gases exhausted from the rotary kiln to the atmosphere before they are delivered to the heat exchange means wherein they serve to preheat the raw material. This conventional solution to the problem has the disadvantage of reducing the thermal efficiency of the plant. It has the further disadvantage of requiring costly gas purification devices to avoid air pollution.

It is a primary object of this invention to permit a more economical use of poor solid, sulfur-containing fuels in the production of cement clinker in installations of the indicated type.

According to one aspect of the invention, the above and other objects are accomplished with an installation which comprises a rotary kiln for producing the cement clinker and having an inlet for the raw material and a gas exhaust. A multi-stage heat exchange means is connected to the gas exhaust for preheating the raw material in contact with gas exhausted from the kiln and a means for burning a solid fuel produces a combustible gas feeding calories to the kiln. A conduit connects the solid fuel burning means to the kiln, the conduit having a vertical portion with a lower end connected to the solid fuel burning means whereby the combustible gas passes in an upward draft through the vertical portion. A raw material distributor means divides the raw material into two fractions, the distributor means having an outlet connected to the lower end of the vertical conduit portion for delivering one of the raw material fractions into the vertical conduit portion whereby the one raw material fraction is suspended in the upward draft of the combustible gas before it is delivered to the kiln. Optionally and preferably, a calcination stage is connected to the heat exchange means for calcining the preheated raw material before it is delivered to the rotary kiln and the vertical conduit portion is connected to the calcination stage whereby the combustible gas furnishes calories to the calcination stage for calcining the preheated raw material.

In the production of cement clinker according to this invention, the calcium carbonate, which is a constituent of the dry raw material, is decomposed in contact with the gasified fuel into hot carbonic gases and lime which reacts with any sulfur compounds in the fuel to produce calcium sulfide and this can be separated from the gasified fuel before it is delivered to the calcination stage and/or the kiln. In this manner, the fuel used in the cement clinker production is desulfurized without thermal losses. Another advantage of this procedure resides in the fact that the decomposition of calcium carbonate is an endothermic reaction which cools the gas and, therefore, makes it possible to gasify the fuel at a high temperature without necessitating the provision of high refractory linings in the conduit connecting the solid fuel burning means to the calcination stage or kiln.

If the heat exchange means used for preheating the dry raw material is a multi-stage heat exchanger, particularly in case the heat exchanger stages are constituted by cyclones, the fraction of the raw material used for the desulfurization of the gasified fuel may be removed at the outlet of the last heat exchanger stage or from an intermediate stage. It could also be removed at the inlet of the heat exchanger.

The above and other objects, advantages and features of the present invention will become more apparent from the following detailed description of a now preferred embodiment thereof, taken in conjunction with the single FIGURE of the accompanying schematic drawing illustrating an installation for producing cement clinker in accordance with this invention.

Referring now to the drawing, the installation is shown to comprise rotary tubular kiln 10 which has an upstream end with respect to the circulation of the dry raw material which is introduced into kiln 10 through this end for conversion to cement clinker. Casing 17 defining a smoke chamber is affixed to kiln 10 at the upstream end and receives hot flue gases from the kiln, the gases being exhausted from the kiln to flow in a first direction. The kiln is heated by burner 38 mounted at the opposite, downstream end and the kiln is slightly inclined to facilitate the flow of the material along the kiln from the upstream to the downstream end where the cement clinker is discharged into cooler 16, all in an entirely conventional manner.

The illustrated heat exchange means for preheating the dry raw material in heat exchange with combustion gases exhausted from the rotary kiln before it is delivered into the kiln is constituted by two groups of multi-stage heat exchangers. The installation comprises calcination stage 12 connected to the heat exchange means for calcining the preheated raw material before it is delivered to rotary kiln 10, and one group of the multi-stage heat exchangers is associated with the kiln while the other group is associated with the calcination stage. The stages of the illustrated heat exchangers are constituted by cyclones.

As shown, the first group of multi-stage heat exchangers is connected to the gas exhaust of kiln 10 and comprises cyclones 5, 4, 3 and twin cyclone 2 connected in series by flues 20, 22 and 24, flue 18 connecting the kiln gas exhaust to cyclone 5 and the exhaust gases flowing through these flues and series-connected cyclones in a first direction indicated by arrows showing the updraft of the gases flowing through the heat exchange means. Flue 25 connects twin cyclone 2 to fan 26 which produces the gas flow in this first direction. The outlets of the cyclones are connected in series with the inlets of the preceding cyclones so as to produce a counter-current flow of raw material through the heat exchanger, the dry raw material being suspended in the updraft of the exhaust gases and flowing therethrough in a second direction. As shown, the outlets of twin cyclone 2 are connected by conduit 21 to flue 22 leading to preceding cyclone 3, the outlet of cyclone 3 is connected by conduit 19 to flue 20 leading to preceding cyclone 4, and the outlet of cyclone 4 is connected by conduit 17 to flue 18 leading to preceding cyclone 5. Conduit 27 connects the outlet of cyclone 5 to flue 28 which connects clinker cooler 16 to calcination stage 12 to conduct cool air from the cooler to the calcination stage.

The second group of multi-stage heat exchangers comprises cyclones 9, 8, 7, 6 and twin cyclone 1 connected in series by flues 48, 30, 32 and 34, the inlet of cyclone 9 being connected to calcination stage 12 by flue 11. Means 14 for burning a solid fuel to produce a combustible gas feeding calories to calcination stage 12 and kiln 10 is connected by flue 40 to the calcination stage, the gasified fuel flowing in a first direction indicated by arrows through the flues connecting the calcination stage and cyclone stages of the heat exchanger. The outlet of twin cyclone 1 is connected by flue 45 to fan 36 to produce the gas flow in this direction in an updraft. The dry raw material is fed to the installation at A into flue 34 where it is carried into twin cyclone 1. The outlets of this twin cyclone are connected by conduits 23 and 31 respectively to conduit 24 in the first group of heat exchangers to deliver a first portion of the raw material to this group of heat exchangers for preheating and to conduit 32 in the second group of heat exchangers for delivering a second portion of the raw material to the second group of heat exchangers for preheating. The cyclones of the second group of heat exchangers are series-connected, conduit 31 leading into flue 32, conduit 29 connecting the outlet of cyclone 6 to flue 30, conduit 43 connecting the outlet of cyclone 7 to conduit 48 and the outlet of cyclone 9 being connected to the inlet of kiln 10 by conduit 13.

According to this invention, conduit 40 connecting solid fuel burner means 14 to calcination stage 12 and thus to kiln 10 has vertical portion 40a with a lower end connected to the solid fuel burner means whereby the combustible gas generated in means 14 passes in an upward draft through the vertical portion and furnishes calories to calcination stage 12 for calcining the preheated raw material. Preferably, as shown, cyclone 42 is connected to the upper end of vertical conduit portion 40a for separating the material suspended in the upward draft of the combustible material from the gas. The preferred embodiment of the fuel burning means illustrated herein comprises moving grid 15 supporting a fluidized bed of the solid fuel. The grid is so inclined, or has at least a downstream end so inclined, that the downstream end of the mobile grid is situated at a level at least as high as, or higher than, the upper level of the fludized bed.

The outlet of cyclone 8 in the second group of multi-stage heat exchangers is connected in accordance with the invention with raw material distributor means 44 for dividing the preheated and calcined raw material into two fractions. The raw material distributor means has an outlet connected to the lower end of vertical conduit portion 40a for delivering one fraction of the raw material into the vertical conduit portion whereby this raw material fraction is suspended in the upward draft of the combustible gas coming from burner means 14 before it is delivered to the calcination stage and the kiln. Distributor means 44 has another outlet connected to flue 28 for delivering another raw material fraction to this flue wherein the air coming from cooler 16 carries the other raw material fraction to calcination stage 12 for calcining. The fraction of the raw material suspended in the gasified fuel in vertical conduit portion 40a causes the gasified fuel to be desulfurized and the reaction products of the desulfurization are separated from the gasified fuel in cyclone 42 before the fuel is used in the cement clinker production, the desulfurized gasified fuel being delivered to the calcination stage and the kiln through the hereinabove described circuit of flues in which the material flows countercurrently.

Control 46 for raw material distributor 44 is responsive to the temperature of the gasified fuel in conduit 40 to regulate the raw material fractions delivered from the respective outlets of distributor 44 to flue 28 and vertical conduit portion 40a, respectively. It has been found that, normally, the fraction of the preheated raw material delivered to vertical conduit portion 40a for desulfurization of the gasified fuel constitutes about 2% to 10%, by weight, of the total raw material preheated in heat exchange with the combustion gases exhausted from the kiln 10 and from the calcination stage 12.

According to a preferred feature of the present invention, control 46 will be so set that the temperature of the gasified fuel downstream from the point of injection of the preheated raw material fraction ranges between about 800° C. and 950° C. The gasification of the solid fuel is preferably effected in a fluidized bed of fuel and ashes at a temperature permitting the agglomeration of the ash particles, and these agglomerated particles are removed by the moving grid.

The operation of the hereinabove-described installation will partially be obvious from the illustrated structure and will now be described in detail.

The raw material introduced at A is carried by the upward draft of the desulfurized gasified fuel circulating through flues 11, 48, 30, 32 and 34 into twin cyclone 1 where the material is divided into two substantially equal portions, one of the portions being delivered by conduit 23 into the first group of heat exchangers 2, 3, 4 and 5 while the other portion is introduced by conduit 31 into the second group of heat exchangers 6, 7, 8 and 9. The one raw material portion is preheated by the countercurrent flow of gases exhausted from kiln 10 and the preheated material is delivered from cyclone 5 through conduit 27 into flue 28 where the cool air from cooler 16 entrains the preheated raw material portion to calcination stage 12.

The other raw material portion is preheated by the countercurrent flow of the gases flowing from the calcination stage through flues 11, 48, 30, 32 and 34, and the preheated material is delivered from cyclone 8 to distributor 44 where it is divided into two fractions of considerably differing proportions. The much larger fraction is delivered to flue 28 where it mixes with the raw material portion coming from the first group of heat exchangers and flows to the calcination stage. The much smaller raw material fraction used for the desulfurization of the gasified fuel in conduit 40 is injected into the conduit at the lower end of vertical conduit portion 40a. The distributor is controlled by gage 46 which, as indicated by broken lines, is connected to distributor 44 as well as to vertical conduit portion 40a so that the control is responsive to the temperature of the gases in this conduit portion.

The desulfurized gasified fuel coming from the cyclone 42 burns in calcination stage 12 with the air coming from cooler 28 to furnish the calories required for the calcination of the raw material. The calcined material leaves the calcination stage through flue 11 to enter cyclone 9 where the calcined material is separated from the gases and introduced into rotary kiln 10 through conduit 13 for conversion into cement clinker. The discharged clinker is then cooled by air introduced into cooler 16 and the cooling air is then used as secondary air in the kiln for burning the fuel introduced by burner 38 and in the calcination stage for burning the gasified fuel coming from solid fuel burning means 14 where air injected under grid 15 maintains the solid fuel in a fluidized state and assures its partial combustion. The air flow is kept substantially below the flow theoretically necessary for combustion and is so controlled that the temperature in the fluidized fuel bed is maintained at an elevated level sufficient to permit agglomeration of the ash particles forming the fuel and the agglomerated particles are removed by deposition on the grid and its removal by the moving grid.

The gases produced in solid fuel burner means 14 have a temperature of the order of about 1,100° C. to 1,200° C. The fraction of the raw material introduced by distributor means 44 into vertical conduit portion 40a has the effect of lowering this temperature to about 900° C. and assures the desulfurization thereof according to the following reaction:

$$CaCO_3 \rightarrow CaO + CO_2$$

$$CaO + H_2S \rightarrow CaS + H_2O$$

These reactions are enhanced by a gas temperature in the range of about 800° C. to 950° C. and a fine granulation of the raw material, preferably to average a grain size of less than about 100 microns. Under these conditions, the desulfurization reactions proceed very rapidly.

The resultant reaction products as well as any particles of ashes entrained by the gasified fuel are separated from the desulfurized gasified fuel in cyclone 42.

If desired, a first cyclone for separating the ashes from the gasified fuel could be placed at the outlet of solid fuel burning means 14 and the separated fuel particles may be returned from this cyclone to means 14 while the raw material used for desulfurization of the gasified fuel is then injected in the stream of gaseous fuel downstream of said first cyclone and separated therefrom in a second cyclone mounted farther downstream in conduit 40. The calcium sulfide formed in the desulfurization reactions and separated from the gasified fuel may be economically used to produce gypsum added to the crushed clinker for the manufacture of cement.

The fraction of the raw material fed from cyclone 8 to vertical conduit portion 40a is so regulated by control 46 that the temperature of the gasified fuel downstream from the point of injection of the desulfurizing raw material is maintained at a value equal to the nominal value, for example of the order of 900° C.

While the desulfurizing fraction of raw material is illustrated as being removed from cyclone 8 of the second group of heat exchangers, it would be possible to remove it from any cyclone of the two groups of heat exchangers. If desired, it would even be possible to use cold raw material for this purpose, in which case distributor means 44 would be mounted at A upstream of the heat exchange means.

The described and illustrated process and installation for producing cement clinker makes it possible to desulfurize gasified fuels used to furnish calories to the kiln and/or the calcination stage much more thoroughly and at a much lower cost than has been possible in conventional procedures. Furthermore, if the solid fuel burner means is operated at a temperature at which the ashes are agglomerated, most of the ash particles will be easily and dependably removed by the moving grid in the burner means, rather than being entrained by the upward draft of the gasified fuel and only a small amount of ashes remaining to be separated in cyclone 42. In this way, fuel producing a great amount of ashes may be used, such as oil shale or bituminous fuels, without harming the quality of the cement clinker.

While the present invention has been described and illustrated in connection with a now preferred embodiment thereof, it will be understood that many variations and modifications may occur to those skilled in the art, particularly after benefitting from the present teaching, without departing from the spirit and scope of this invention, as defined in the appended claims.

What is claimed is:
1. An installation for producing cement clinker from dry raw material, which comprises
  (a) a rotary kiln for producing the cement clinker and having an inlet for the raw material and a gas exhaust,
  (b) multi-stage heat exchange means connected to the gas exhaust for preheating the dry raw material in contact with gas exhausted from the kiln,
  (c) a calcination stage connected to the heat exchange means for calcining the preheated raw material before it is delivered to the rotary kiln,
  (d) means for burning a solid fuel to produce a combustible gas feeding calories to the calcination stage,
  (e) a conduit connecting the solid fuel burning means to the calcination stage, the conduit having a vertical portion with a lower end connected to the solid fuel burning means whereby the combustible gas passes in an upward draft through the vertical portion, and
  (f) a raw material distributor means for dividing the raw material into two fractions, the distributor means having an outlet connected to the lower end of the vertical conduit portion for delivering one of the raw material fractions into the vertical conduit portion whereby the one raw material fraction is suspended in the upward draft of the combustible gas before it is delivered to the calcination stage.
2. The installation of claim 1, further comprising another conduit connecting said solid fuel burning means to the kiln whereby the combustible gas furnishes calories to the kiln.
3. The installation of claim 1 or 2, wherein the distributor means is arranged at an outlet of one of the heat exchange means stages for dividing the preheated raw material into said fractions.
4. The installation of claim 3, further comprising a cyclone connected to an upper end of the vertical conduit portion for separating the material suspended in the upward draft of the combustible gas from the gas.
5. The installation of claim 1 or 2, wherein the means for burning the solid fuel comprises a mobile grid supporting a fluidized bed of the solid fuel, the grid having a downstream end so inclined that the downstream end of the mobile grid is situated at a level higher than the upper level of the fluidized bed.

* * * * *